May 15, 1934.    L. L. MOHLER    1,958,923
COVER FOR HIGH PRESSURE LIQUEFIERS
Filed July 31, 1933
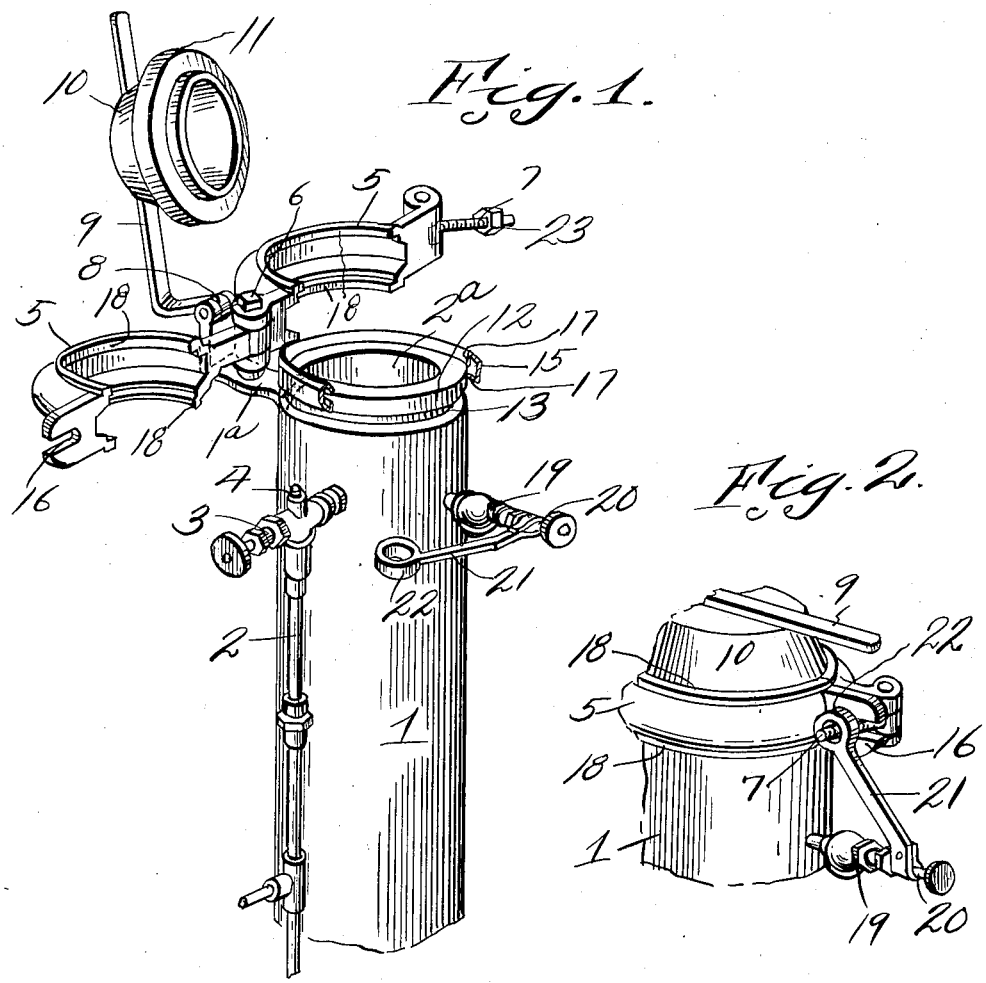
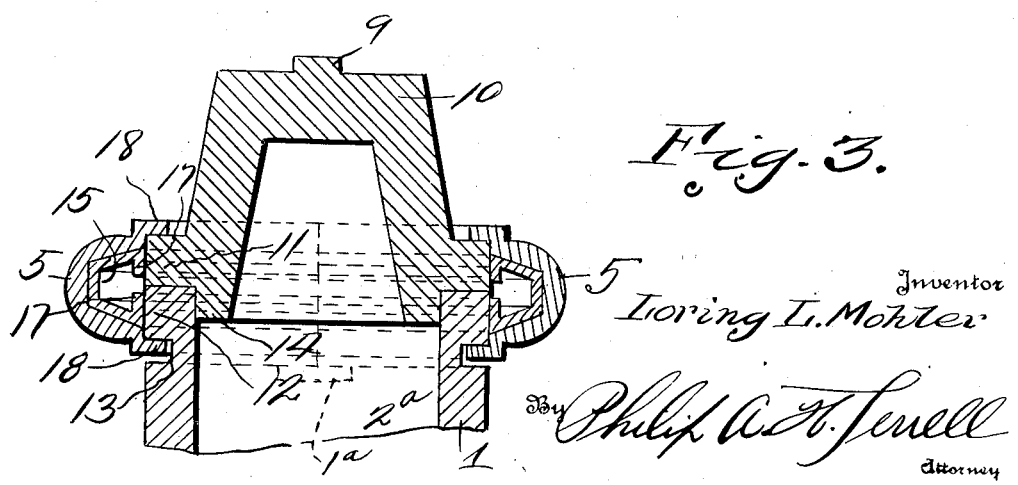
Inventor
Loring L. Mohler
By Philip A. H. Sewell
Attorney Patented May 15, 1934

1,958,923

UNITED STATES PATENT OFFICE 1,958,923

COVER FOR HIGH PRESSURE LIQUEFIERS

Loring L. Mohler, Quinlan, Tex., assignor to CO$_2$ Appliance Company, Tulsa, Okla.

Application July 31, 1933, Serial No. 683,089

7 Claims. (Cl. 220—24)

The invention relates to covers for high pressure liquefiers, for instance those used in connection with carbonating mechanism for soda fountains, and in which carbon dioxide is placed and allowed to liquefy and has for its object to provide a cover comprising segmentally shaped channel members adapted to receive a gasket and adjacent flanges of a cover and a receptacle for forming a leak proof connection between the cover and the receptacle.

A further object is to provide a toggle bolt connection between the segmentally shaped sections for forcing the same into close binding engagement with the channelled gasket and contracting the same against the flanges of the cover and the receptacle to form a leakproof connection.

A further object is to hingedly connect the cover segments at one side of the receptacle and the cover adjacent said hinging point and movable in a vertical plane.

A further object is to provide the receptacle with a relief valve and means controlled by the relief valve and cooperating with the cover whereby it will be impossible to open the cover until the relief valve is opened.

A further object is to dispose the relief valve adjacent the securing means for the cover and to provide the relief valve 10 with means cooperating with the securing means of the cover for perventing the release of the securing means of the cover until the relief valve is opened.

A further object is to shape the gasket in a manner whereby pressure, which may escape between the cover and the receptacle, would enter the gasket channel and expand the same, thereby additionally insuring a sealed leakproof connection.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the upper end of the liquefier showing the cover in open position.

Figure 2 is a perspective view of the cover, showing the same in closed position.

Figure 3 is a vertical transverse sectional view through the cover in closed position.

This application is a divisional part of my application for patent on a liquefier, Ser. #560,824, filed September 2, 1931.

Referring to the drawing, the numeral 1 designates the liquefier receptacle, 2 a discharge pipe therefrom, which discharge pipe is provided with a control valve 3 and a fracture valve 4 adapted to fracture upon excessive pressures. In liquefiers of this character wherein solid carbon dioxide is placed and sublimed, high pressures are attained, for instance twelve hundred pounds to the square inch, therefore it will be seen that it is necessary to provide an extremely efficient cover which will allow refilling of the receptacle, and at the same time will prevent escape of the generated gas, and to accomplish this result the present cover is primarily designed.

Carbon dioxide is placed in the receptacle 1 through the filling opening 2 thereof and after which the cover is closed. The cover comprises segmentally shaped channelled members 5, which are hingedly connected together at 6 at one side of the receptacle, and adapted to swing towards and away from each other in a horizontal plane. Hingedly connected at 8 to the rear side of the receptacle adjacent the hinging point 6 is an angularly shaped handle 9 adapted to be grasped by the operator to move the cover 10 to open or closed position. The cover 10 is provided with an annular flange 11 of the same exterior diameter as the annular flange 12 carried by the upper end of the liquefier 1 and formed by the peripheral channel 13 in the liquefier 1.

Referring to Figure 3 it will be seen when the cover 10 is in closed position its flange 14 will be disposed within the chamber 2, and its flange 11 will rest on the flange 12 and register therewith. Then the segmentally shaped members 5 are hingedly moved to a closed position after the channelled gasket 15 has been placed in position around the outer periphery of the flanges 11 and 12. The channelled gasket 15 is forced into close binding engagement with the outer peripheries of the flanges 11 and 12 by the tightening of the toggle bolt 7 after it has been moved into the bifurcated lug 16 carried by the other cover segment.

It will be noted that any leakage between the cover 10 and the receptacle end will enter the channelled gasket 15 and will expand the same particularly its inner flanges 17, which engage the peripheries of the flanges 11 and 12, thereby additionally insuring a tight connection, and one through which it has been found that carbon dioxide gas will not easily leak. It will be noted that the segments 5 are provided with flanges 18 which overlie the flanges 11 and 12, thereby holding the cover 10 against being forced open by excessive pressure, and against opening until the segments 5 are released, consequently accidental opening of the cover is prevented as well as the forcing of the cover to open position under excessive pressure. To further prevent opening of the cover when there are high pressures in the vessel, the receptacle is provided with a relief valve 19, adjacent the segments 5 and the securing bolts 7, and this relief valve exhausts to the atmosphere in a conventional manner and has its stem 20 provided with an arm 21 having a nut receiving loop 22 thereon, and adapted to receive the toggle bolt nut 23 and hold the same against until the relief valve 19 is moved to open position.

When it is desired to fill the chamber 2 with solid carbon dioxide, there should be substantially no pressure within the chamber 2 when the cover 10 is removed, however it is extremely important not to open the device until the pressure within the chamber 2 is released, and to accomplish this result, the relief valve 19 is provided, and which relief valve is opened by the rotation of the valve stem 20 on which the arm 21 is mounted; for instance a quarter turn of the valve stem opens the valve, the valve being a quick opening type.

From the above it will be seen that a cover is provided for a liquefier which is simple in construction, positive in its operation; sealed not only by clamping means but by pressure which may enter the gasket, and provided with relief means for the receptacle whereby pressure will be exhausted upon the initial starting of the cover opening operation, thereby preventing injury to the operator, incident to the sudden release of high pressure carbon dioxide gas, ordinarily at a pressure of about twelve hundred pounds.

The invention having been set forth what is claimed as new and useful is:

1. A cover for pressure vessels comprising segmentally shaped channelled members, said channelled members encircling registering flanges of a cover and of a receptacle neck and overlying the opposite sides of the flanges, securing means for said segmentally shaped members and an annular channelled expansion gasket within the channelled members and engaging the outer peripheries of the flanges at opposite sides of point of engagement of the flanges.

2. A cover for pressure vessels comprising engaging flanges carried by the cover and vessel, means for holding said cover on said vessel, said means comprising a separable channelled collar encircling the flanges and overlying the outer sides of the flanges of the cover and vessel and an expansion gasket within the receptacle channelled member and having a channel therein, and into which escaping gases between the cover and vessel flange will enter and additionally expand the gasket.

3. A device as set forth in claim 2 wherein the annular gasket is provided with flanges engaging the outer periphery of the cover and vessel flanges at opposite sides of their point of engagement and against which the gases escaping into the annular gasket will act for sealing purposes.

4. A pressure vessel cover comprising a cover member, a flange carried by the cover member, a flange carried by the vessel and on which the flange of the cover members is disposed, a separable channelled collar encircling the flanges of the cover and vessel and engaging the outer sides of said flanges, an expansion channelled gasket within the collar and transversely arching the engaging point between the flanges, said gasket having its flanges engaging the peripheries of the cover and vessel flanges at opposite sides of the engaging point therebetween, said gasket being expanded by escape gases passing between the flanges of the cover flange and vessel flange.

5. A device as set forth in claim 4 including flanges carried by the gasket flanges and extending towards each other and engaging the peripheries of the cover and vessel flanges.

6. A device as set forth in claim 4 including a hinged connection between the band sections and the vessel.

7. A device as set forth in claim 4 including a bracket carried by the vessel, a hinged connection between the band sections and mounted on brackets, an arm carried by the bracket, said vessel cover being mounted on said arm and adapted to be moved into position on the vessel or hingedly moved to open position above the vessel.

LORING L. MOHLER.